(12) United States Patent
Mittal et al.

(10) Patent No.: US 12,086,561 B2
(45) Date of Patent: Sep. 10, 2024

(54) MULTI-AGENT CONVERSATIONAL AGENT FRAMEWORK

(71) Applicant: International Business Machines Corporation, Armonk, NY (US)

(72) Inventors: Ashish Mittal, Bangalore (IN); Diptikalyan Saha, Bangalore (IN); Priyanka Agrawal, Bangalore (IN); Manasa Markandeya Jammi, Kharagpur (IN)

(73) Assignee: International Business Machines Corporation, Armonk, NY (US)

( * ) Notice: Subject to any disclaimer, the term of this patent is extended or adjusted under 35 U.S.C. 154(b) by 549 days.

(21) Appl. No.: 16/552,557

(22) Filed: Aug. 27, 2019

(65) Prior Publication Data
US 2021/0064706 A1 Mar. 4, 2021

(51) Int. Cl.
*G06F 17/00* (2019.01)
*G06F 40/56* (2020.01)
(Continued)

(52) U.S. Cl.
CPC .............. *G06F 40/56* (2020.01); *G06Q 30/08* (2013.01); *H04L 51/02* (2013.01)

(58) Field of Classification Search
CPC .......... G06F 40/56; G06Q 30/08; H04L 51/02
(Continued)

(56) References Cited

U.S. PATENT DOCUMENTS

| 5,920,848 A * | 7/1999 | Schutzer ................ G06Q 40/02 705/42 |
| 6,236,977 B1 * | 5/2001 | Verba ..................... G06Q 30/02 705/14.39 |

(Continued)

FOREIGN PATENT DOCUMENTS

| CN | 1951082 A | 4/2007 |
| CN | 108886487 A | 11/2018 |

(Continued)

OTHER PUBLICATIONS

Maes, P. et al.,"Agents That Buy and Sell," (1999), ACM, pp. 81-91.*

(Continued)

*Primary Examiner* — Cesar B Paula
*Assistant Examiner* — James H. Blackwell
(74) *Attorney, Agent, or Firm* — Kelli D. Morin (57) ABSTRACT

One embodiment provides a method, including: receiving, within a conversational agent creation framework used to create conversational agents that perform negotiations on behalf of users, (i) a selection of one of a plurality of conversational agent roles (ii) negotiation constraints for the selected role, and (iii) an object for the negotiation; creating a conversational agent (i) having the selected role and (ii) programmed with the negotiation constraints; identifying at least one other conversational agent (i) having an opposing role with respect to the object and (ii) being programmed with opposing role negotiation constraints; and conducting a conversational session between the conversational agent and (Continued)

the at least one other conversational agent, wherein the conversational session comprises the negotiation for the object and wherein the conversational agent and the at least one other conversational agent perform the negotiation in view of the negotiation constraints and the opposing role negotiation constraints.

16 Claims, 4 Drawing Sheets

(51) Int. Cl.
    *G06Q 30/08*     (2012.01)
    *H04L 51/02*     (2022.01)

(58) Field of Classification Search
    USPC .................................................... 704/9
    See application file for complete search history.

(56) References Cited

U.S. PATENT DOCUMENTS

| | | | |
|---|---|---|---|
| 6,401,080 B1 * | 6/2002 | Bigus | G06Q 20/3821 |
| | | | 705/37 |
| 7,103,580 B1 * | 9/2006 | Batachia | G06Q 20/40 |
| | | | 705/1.1 |
| 7,330,826 B1 * | 2/2008 | Porat | G06Q 30/0601 |
| | | | 705/26.3 |
| 7,908,225 B1 * | 3/2011 | Bigus | G06Q 40/04 |
| | | | 705/76 |
| 8,065,173 B2 * | 11/2011 | Abu-Hakima | G06Q 10/109 |
| | | | 705/7.11 |
| 9,224,126 B2 | 12/2015 | Vaidya et al. | |
| 10,116,596 B2 | 10/2018 | Li et al. | |
| 2002/0052797 A1 * | 5/2002 | Maritzen | G06Q 30/0619 |
| | | | 705/7.35 |
| 2002/0069134 A1 * | 6/2002 | Solomon | G06Q 50/188 |
| | | | 705/80 |
| 2002/0178395 A1 * | 11/2002 | Chen | H04M 15/00 |
| | | | 714/2 |
| 2006/0015435 A1 * | 1/2006 | Nathanson | G06Q 20/401 |
| | | | 705/37 |
| 2006/0020565 A1 * | 1/2006 | Rzevski | G06F 9/5027 |
| | | | 706/50 |
| 2006/0225064 A1 * | 10/2006 | Lee | G06F 9/465 |
| | | | 717/168 |
| 2008/0010229 A1 * | 1/2008 | Lee Shu Tak | G06F 8/20 |
| | | | 706/14 |
| 2009/0030848 A1 * | 1/2009 | Wendel | G06Q 50/188 |
| | | | 705/26.1 |
| 2009/0112608 A1 * | 4/2009 | Abu-Hakima | G06Q 30/0242 |
| | | | 705/345 |
| 2012/0078769 A1 * | 3/2012 | Becher | G06Q 40/04 |
| | | | 705/37 |
| 2014/0164953 A1 * | 6/2014 | Lynch | H04L 51/046 |
| | | | 715/753 |
| 2014/0279802 A1 | 9/2014 | Harrington et al. | |
| 2015/0039548 A1 | 2/2015 | Mills et al. | |
| 2016/0125460 A1 * | 5/2016 | Zellner | G06Q 30/0631 |
| | | | 705/14.53 |
| 2016/0180348 A1 * | 6/2016 | Windley | H04L 67/12 |
| | | | 705/80 |
| 2016/0320956 A9 | 11/2016 | Rosenberg | |
| 2017/0287038 A1 * | 10/2017 | Krasadakis | G06Q 30/0201 |
| 2018/0048594 A1 | 2/2018 | de Silva et al. | |
| 2019/0182335 A1 * | 6/2019 | Chen | G10L 15/22 |
| 2020/0372569 A1 * | 11/2020 | Lahiri | H04L 51/02 |

FOREIGN PATENT DOCUMENTS

| | | |
|---|---|---|
| EP | 3435601 A1 | 1/2019 |
| WO | 2003030149 A1 | 4/2003 |

OTHER PUBLICATIONS

Bellosta, M-J.,"An Agent-based Mechanism for Autonomous Multiple Criteria Auctions," (2006), IEEE, 8 pages.*
Jusoh, S.,"Intelligent Conversational Agent for Online Sales," (2018), IEEE, 4 pages.*
Lee, Y.L. et al.,"MoCAAS: Aution Agent System Using a Collaborative Mobile Agent in Electronic Commerce," (2003), Elsevier, pp. 183-187.*
Jennings, N.R. et al.,"Automated Negotiation: Prospects, Methods and Challenges," (2001), Kluwer, pp. 199-215.*
Murugesan, S.,"Intelligent Agents on the Internet and Web," (1998), IEEE, pp. 97-102.*
Zhang, H. et al.,"Agent-based Negotiation in E-Commerce: State of the Art," (2005), IEEE, pp. 233-238.*
Parsons, S. et al.,"Agents that Reason and Negotiate by Arguing," (1998) J. Logic Computat., vol. 8, No. 3, pp. 261-292.*
Zlotkin, G. et al.,"Mechanisms for Automated Negotiation in State Oriented Domains," Journal of AI Research 5 (1996) pp. 163-238.*
Cardoso, H. et al., A Multi-Agent System for Electronic Commerce Including Adaptive Strategic Behaviours, Jan. 1999, 15 pages.*
Chavez, A et al.,"Kasbah: An Agent Marketplace for Buying and Selling Goods," (1996), AAAI, pp. 8-12.*
Doran, J. et al.,"On Cooperation in Multi-Agent Systems," (Jan. 2000) in The Knowledge Engineering Review, pp. 1-7.*
Brenner, W. et al.,"Intelligent Software Agents," (1998) Springer-Verlag Berlin Heidelberg, 330 pages total.*
R. S. T. Lee and J. N. K. Liu, "iJADE Web-miner: an intelligent agent framework for Internet shopping," in IEEE Transactions on Knowledge and Data Engineering, vol. 16, No. 4, pp. 461-473, Apr. 2004, doi: 10.1109/TKDE.2004.1269670.*
Mike P. Papazoglou. 2001. Agent-oriented technology in support of e-business. <i>Commun. ACM</i> 44, 4 (Apr. 2001), 71-77. DOI:https://doi.org/10.1145/367211.367268.*
Lee, R.S.T. (2020). Intelligent Agents and Software Robots. In: Artificial Intelligence in Daily Life. Springer, Singapore. https://doi.org/10.1007/978-981-15-7695-9_8.*
Anthony, Patricia & Hall, W. & Viet Dung, Dang & Jennings, N.. (2001). Autonomous Agents for Participating in Mulitple On-line Auctions.*
Bartolini, Claudio et al. "A Generic Software Framework for Automated Negotiation." (2002).*
Sarit Kraus, "Negotiation and Cooperation in Multi-Agent Environments," Artificial Intelligencevo. 94Issue 1-2Jul. 1997 pp. 79-97https://doi.org/10.1016/S0004-3702(97)00025-8.*
Choi, H.-R. et al., "A Design of Multi-Agent Framework to Develop Negotiation Systems," Journal of Intelligent Information Systems, vol. 9, No. 2, Nov. 2003 (pp. 155-169).*
Fang-Chang Lin and Chien-Nan Kuo, "Cooperative multi-agent negotiation for electronic commerce based on mobile agents," IEEE International Conference on Systems, Man and Cybernetics, 2002, pp. 6 pp. vol. 3-, doi: 10.1109/ICSMC.2002.1176097.*
Oliveira, Rômulo & Gomes, Herman & Silva, Alan & Bittencourt, Ig & Costa, Evandro. (2006). A Multi-Agent Based Framework for Supporting Learning in Adaptive Automated Negotiation.. ICEIS 2006—8th International Conference on Enterprise Information Systems, Proceedings. 153-158.*
Chen, Ye et al. "A negotiation-based Multi-agent System for Supply Chain Management." (1999).*
Choi, Hyung Rim & Kim, Hyun & Hong, Soongoo & Park, Young-Jae & Park, Young & Kang, Moo Hong. (2005). Implementation of framework for developing multi-agent based automated negotiation systems. 306-315. 10.1145/1089551.1089609.*
G. Zhang, G. Jiang and T. Huang, "Design of Argumentation-Based Multi-Agent Negotiation System Oriented to E-Commerce," 2010 International Conference on Internet Technology and Applications, 2010, pp. 1-6, doi: 10.1109/ITAPP.2010.5566198.*
Maira Gatti De Bayser et al., "A Hybrid Architecture for Multi-Party Conversational Systems", May 8, 2017, 40 pages, arXiv:1705.01214v2 [cs.CL] May 4, 2017.

* cited by examiner

MULTI-AGENT CONVERSATIONAL AGENT FRAMEWORK

BACKGROUND

When a user has a problem or question, the user may interact with a conversational agent, for example, chatbot, digital assistant, virtual assistant, or the like. Chatbots generally capture text-based input, for example, a user may access a conversational window and provide text input to the window. The chatbot then processes the input and provides a responsive output, usually as a text-based output. Digital or virtual assistants may include assistants that receive voice input, process the voice input, and then provide a responsive output, for example, by audio, by performing a function, or the like. Conversational agents provide a method for a user to receive assistance with a problem or query that does not require a human user. The conversational agents are programmed to process input and provide output responsive to the input in a manner similar to how another human would engage in the conversation. Conversational agents can also be used as system assistants that assist users in performing tasks, for example, building machine-learning models, developing applications, and the like.

BRIEF SUMMARY

In summary, one aspect of the invention provides a method, comprising: receiving, within a conversational agent creation framework used to create conversational agents that perform negotiations on behalf of users, (i) a selection of one of a plurality of conversational agent roles, each of the plurality of conversational agent roles corresponding to a role within a negotiation, (ii) negotiation constraints for the selected role, and (iii) an object for the negotiation; creating, within the conversational agent creation framework, a conversational agent (i) having the selected role and (ii) programmed with the negotiation constraints; identifying, within the conversational agent creation framework, at least one other conversational agent (i) having an opposing role with respect to the object and (ii) being programmed with opposing role negotiation constraints; and conducting a conversational session between the conversational agent and the at least one other conversational agent, wherein the conversational session comprises the negotiation between the conversational agent and the at least one other conversational agent for the object and wherein, within the conversational session, the conversational agent and the at least one other conversational agent perform the negotiation in view of the negotiation constraints and the opposing role negotiation constraints.

Another aspect of the invention provides an apparatus, comprising: at least one processor; and a computer readable storage medium having computer readable program code embodied therewith and executable by the at least one processor, the computer readable program code comprising: computer readable program code configured to receive, within a conversational agent creation framework used to create conversational agents that perform negotiations on behalf of users, (i) a selection of one of a plurality of conversational agent roles, each of the plurality of conversational agent roles corresponding to a role within a negotiation, (ii) negotiation constraints for the selected role, and (iii) an object for the negotiation; computer readable program code configured to create, within the conversational agent creation framework, a conversational agent (i) having the selected role and (ii) programmed with the negotiation constraints; computer readable program code configured to identify, within the conversational agent creation framework, at least one other conversational agent (i) having an opposing role with respect to the object and (ii) being programmed with opposing role negotiation constraints; and computer readable program code configured to conduct a conversational session between the conversational agent and the at least one other conversational agent, wherein the conversational session comprises the negotiation between the conversational agent and the at least one other conversational agent for the object and wherein, within the conversational session, the conversational agent and the at least one other conversational agent perform the negotiation in view of the negotiation constraints and the opposing role negotiation constraints.

An additional aspect of the invention provides a computer program product, comprising: a computer readable storage medium having computer readable program code embodied therewith, the computer readable program code executable by a processor and comprising: computer readable program code configured to receive, within a conversational agent creation framework used to create conversational agents that perform negotiations on behalf of users, (i) a selection of one of a plurality of conversational agent roles, each of the plurality of conversational agent roles corresponding to a role within a negotiation, (ii) negotiation constraints for the selected role, and (iii) an object for the negotiation; computer readable program code configured to create, within the conversational agent creation framework, a conversational agent (i) having the selected role and (ii) programmed with the negotiation constraints; computer readable program code configured to identify, within the conversational agent creation framework, at least one other conversational agent (i) having an opposing role with respect to the object and (ii) being programmed with opposing role negotiation constraints; and computer readable program code configured to conduct a conversational session between the conversational agent and the at least one other conversational agent, wherein the conversational session comprises the negotiation between the conversational agent and the at least one other conversational agent for the object and wherein, within the conversational session, the conversational agent and the at least one other conversational agent perform the negotiation in view of the negotiation constraints and the opposing role negotiation constraints.

A further aspect of the invention provides a method, comprising: providing a chat agent creation framework providing chat agents that interact with each other, each of the chat agents (i) having a role within a transaction for an object and (ii) having a monetary objective with respect to the object; defining a seller chat agent, within the chat agent creation framework, having a seller role, the defining being based upon input from a user identifying (i) an object for sale and (ii) the monetary objective of the user; defining at least one buyer chat agent, within the chat agent creation framework, having a buyer role, the defining based upon input from another user identifying (i) a desire to purchase the object for sale and (ii) the monetary objective of the another user; and engaging, utilizing the seller chat agent and the at least one buyer chat agent, in a conversational session comprising a negotiation for the object, wherein the seller chat agent and the at least one buyer chat agent engage in the negotiation in view of the respective monetary objective of the chat agent.

For a better understanding of exemplary embodiments of the invention, together with other and further features and advantages thereof, reference is made to the following

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

Conventional conversational agent systems require a human user on at least one side of the conversation. For example, a user may access a conversational agent and interact with the conversational agent to receive assistance with a question, problem, or query. In such a system, there is a single user and a single conversational agent. As another example, multiple users may access a conversational agent system and interact with a conversational agent system in order to perform a task, for example, develop a machine-learning model. In such a system, there are multiple users of the same type and a single conversational agent. As another example, a user may access a conversational agent system and interact with multiple conversational agents, with each conversational agent performing a unique function within the system. In such a system, there is a single user and multiple conversational agents. However, what conventional conversational agent systems do not allow is multiple users of different types interacting with multiple conversational agents, or, more specifically, multiple users of different types being represented by multiple conversational agents in the same conversational session.

Accordingly, an embodiment provides a system and method for providing a conversational agent creation framework for multi-agent conversational sessions. In other words, the system provides a technique that allows for multiple users to be represented by a conversational agent within the same conversational session, thereby eliminating the need for a human user to be involved in the conversational session. Thus, the system provides that conversational agents can be selected, by human users, for a role within the conversational session, with different agents having opposing roles within the conversational session. The system provides a conversational agent creation framework that is used to create conversational agents to perform negotiations on behalf of human users. The system receives, from a user, a selection of a role for the conversational agent. For example, the user may select a buyer or seller role for a negotiation to sell/purchase an object. The user also provides negotiation constraints that identify parameters with respect to an object of the negotiations. For example, the user may identify a monetary value, either as a purchase price or as a sales price, for the object. The user may also identify the object to be sold or purchased.

The conversational agent creation framework creates the conversational agent having the selected role and programmed with the negotiation constraints. Within the conversational agent framework there may be many instances of a conversational agent having a particular role. For example, there may be multiple conversational agents that have a seller role and multiple conversational agents that have a buyer role. Each instance of the role may then be associated with a different user, a different object, different constraints, and/or the like. After the conversational agents are created, the system may attempt to identify if there is another conversational agent with an opposing role with respect to the object within the framework. As an example, the system may determine whether there is a conversational agent corresponding to a buyer who wants to buy the object a seller is attempting to sell, or, conversely, if there is a conversational agent corresponding to a seller who is trying to sell an object a buyer is attempting to buy. The conversational agent with the opposing role will also be programmed with negotiation constraints that are appropriate for the role of the conversational agent. Once the conversational agents have been identified and created, the system conducts a conversational session between the identified agents, which may include more than two agents, in order to perform the negotiations for the object. These negotiations are performed in view of the negotiation constraints of each of the conversational agents in order to maximize the objective of the user corresponding to the conversational agent.

Such a system provides a technical improvement over current conversational agent systems by providing a system that allows for creation of conversational agents having different, opposing roles within a conversational session, and that can communicate between each other automatically and autonomously to meet objectives of a user corresponding to the conversational agent. The user does not have to be present while the negotiations are occurring, thereby allowing the user to perform negotiations at times when the user cannot otherwise be available or when the user does not want to be directly involved in the negotiations. Additionally, since the conversational agents can act autonomously, the user can set up multiple conversational agents for many different objects or negotiations. Thus, the described system and method provides a new conversational agent framework that allows for multiple conversational agents having different roles to be created and utilized within the same system and conversational session. In other words, the described system and method provides a new conversational agent framework that allows for conversational agents to interact between each other on behalf of human users, without requiring the human users to intervene unless the user wants to intervene. Such a system does not exist in current conventional conversational agent frameworks which currently require at least one human user for interaction.

Figure 1:
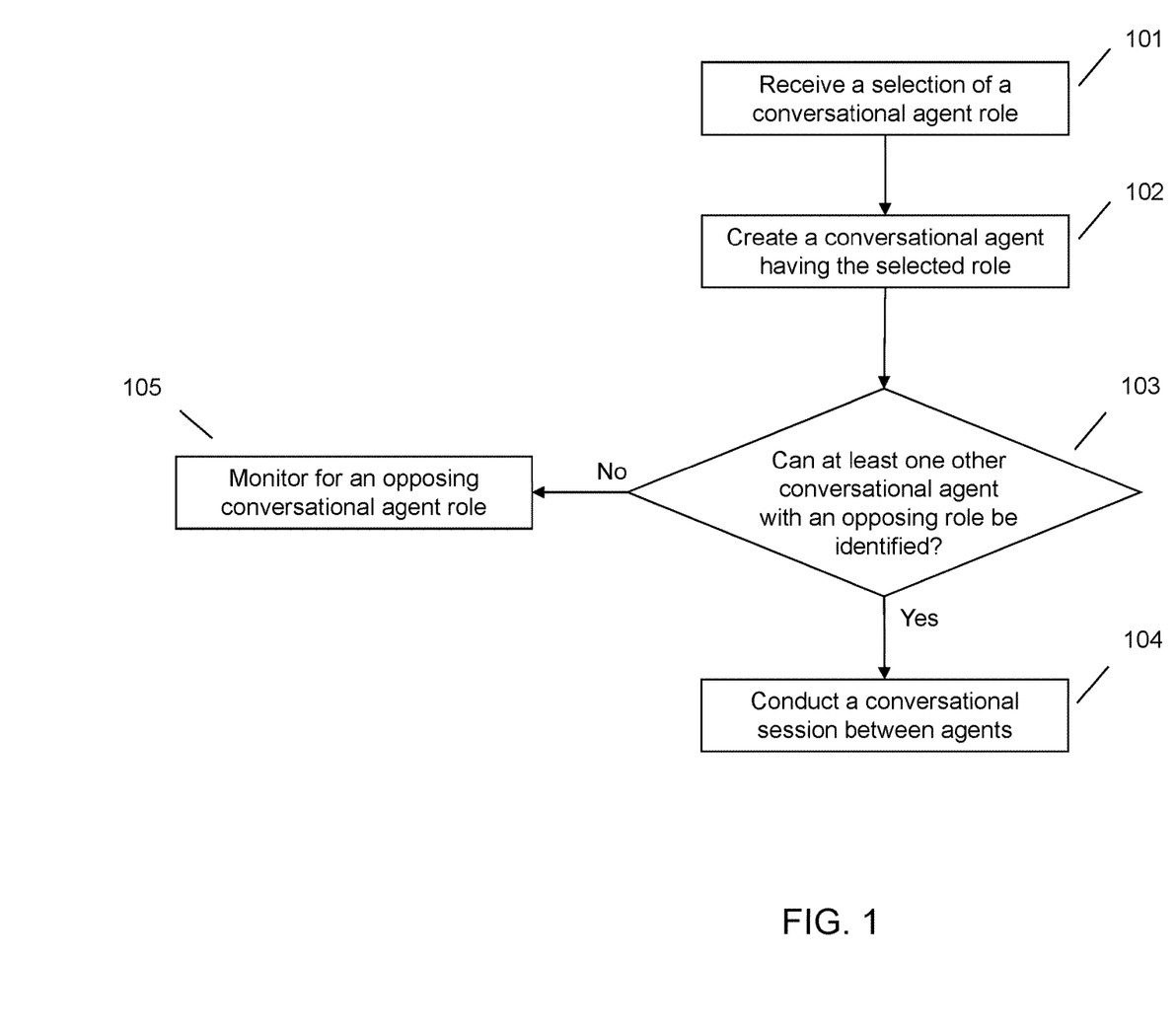
FIG. 1 illustrates a method of providing a conversational agent creation framework for multi-agent conversational sessions.

FIG. 1 illustrates a method for providing a conversational agent creation framework for multi-agent conversational sessions. The system may provide a conversational agent creation framework that allows a human user to create a conversational agent, chatbot, or chat agent that interfaces with other users or conversational agents on the user's behalf. For example, the conversational agents may interface with other conversational agents in order to perform negotiations, arbitrations, or transactions on behalf of human users. Thus, within the conversational agent creation framework, a user may provide a selection of a role for the conversational agent. Different roles within the conversational agent creation framework may have different intents and entities. In the context of this application, an intent refers to a conversational agent intent and corresponds to an objective or purpose of the conversational agent. Thus, each role within the conversational agent creation framework has specific intents that are unique to the role and/or the generated conversational agent.

The conversational agent creation framework includes a plurality of roles that can be selected by a user based upon what the user wants to accomplish. Additionally, the conversational agent creation framework includes opposing roles, for example, roles that would be on opposite sides of a negotiation. For ease of readability, this application will refer to a working example of a seller wanting to sell a painting and at least one buyer wanting to buy the painting. However, this example is merely illustrative and it should be understood that the described conversational agent creation framework can be used for generating conversational agents for any type of negotiation, arbitration, or transaction, and, thus, allows for selection of roles that would support such negotiations, arbitrations, or transactions. Using the buying and selling example, the conversational agent creation framework includes a buyer role and a seller role, which are opposing roles for a negotiation to buy/sell the painting.

The user also provides information corresponding to the negotiation constraints for the selected role. Negotiation constraints are related to the objective of the user. Thus, negotiation constraints may be any type of requirement that a user has with respect to the negotiation. Example negotiation constraints include, but are not limited to, monetary constraints, geographical constraints, time constraints, and the like. As an example, if the user has selected a seller role for the conversational agent, the user may identify a hard monetary value corresponding to a minimum amount of money that the user is willing to take for the object. The user may also identify a soft monetary value corresponding to a desired amount of money that the user would like to get for the object. The soft monetary value is generally higher than the hard monetary value, but may be the same, or not provided at all.

The user may also identify a particular geographical region for listing the item for sale, that the user is willing to ship the item to, or sell the item within. The user may also identify that the item should be identified for sale for a particular time frame. All of these parameters may be utilized as negotiation constraints. Conversely, if the user has selected a buyer role for the conversational agent, the user may identify similar constraints or objectives as discussed with respect to the seller role. However, the user would identify the maximum monetary amount that the user is willing to pay for an item as a hard monetary amount, and a monetary amount that the user would prefer to pay as a soft monetary amount. Finally, the user also identifies an object of the negotiation. Using the working example, the seller would identify the painting as the object for sale and the buyer would identify the painting as the object to be bought. The users may also provide other information, for example, identifying information of the user and/or object (e.g., geographic location, name, description of the object, user identifier, etc.), pictures of the object, user preferences, and/or the like.

At 102, the system creates the conversational agent(s) within the conversational agent creation framework. The system may first create an arbitration or negotiation instance. The conversational agent creation framework may include multiple arbitration instances, with each instance being unique to an object and/or user. In other words, for each object that will be a subject of an arbitration or negotiation, even if the objects are similar to other objects within the framework, the system creates a unique arbitration instance. Within the arbitration instance the system adds arbitration entities which correspond to the object. Each arbitration entity may have object identifiers that correspond to the object of the arbitration entity. Example object identifiers include an object name, an object price (e.g., a starting price, an asking price, a requested price, etc.), and the like. If the arbitration includes multiple objects, for example, the seller is selling a package with more than one object, the seller is selling multiples of the same object, or the like, the system creates an arbitration entity for each object. Using the working example, an arbitration entity would be created for the painting and would include a description identifier, price identifier, and the like, within the arbitration entity.

The arbitration instance provides a structure where other parameters, entities, and objects of the arbitration can be populated. Thus, once the arbitration instance is created, the system can add the conversational agents that correspond to the arbitration. The system creates a conversational agent that corresponds to the role selected by the user. Using the working example, the system creates a conversational agent having a seller role with respect to the painting. When creating the conversational agent(s), the system programs the conversational agent with the negotiation constraints identified by the user. Some of these negotiation constraints will be programmed as role specific intents. Each role has different intents, objectives, or purposes. For example, a seller role would have an intent corresponding to wanting to sell an object and an intent corresponding to a price the seller wants to receive for the object. Conversely, a buyer role would have an intent corresponding to wanting to buy an object and an intent corresponding to a price the buyer wants to pay for the object. These intents can be identified from the constraints that the user provided at 101.

The conversational agent is also programmed with some entities that are specific to the role and/or user. Some example entities include a username of the user, a geographical location or address of the user or object, and the like. The conversational agent may also be programmed with goal specific intents. These intents may correspond to the desires of the corresponding user. For example, a goal specific intent may be to register the user within the arbitration/negotiation system for selling/buying an object for a particular price. As another example, a goal specific intent may be, for a seller, a minimum price for selling an object and a desired price for selling the object. The minimum price may be the lowest price that the seller is willing to take for the object, whereas the desired price may be how much the seller actually wants to receive for the object. As another example, a goal specific intent may be, for a buyer, a desired purchase price and a maximum purchase price. The desired price may be the amount that the buyer would like to purchase the item for, whereas the maximum purchase price may be the highest amount that the buyer is willing to pay for the object.

The system may also program or add additional components within the arbitration instance. For example, the system may create an arbitration memory specification that includes all the data, including metadata, corresponding to the arbitration instance. These data may include not only the data regarding the instance itself, but also data regarding any components included within the instance, for example, data corresponding to the object, the conversational agents within the arbitration instance, the roles, and the like. The data may also include the state of the arbitration. The state of the arbitration may identify the progress of the arbitration, for example, whether it is complete, negotiations are ongoing, negotiations have not started at all, and the like. Thus, the state may be identified as unresolved, incomplete, negotiations started, resolved, completed, potential buyer found, or the like. All of this information is stored within a memory corresponding to the arbitration instance.

The arbitration specification may also include intents that are related to the arbitration itself. These intents may correspond to the status of the arbitration and may also correspond to different steps that can be autonomously taken by the conversational agents to meet the objectives of the users. An example intent may be that the sellers expectations have not yet been met. Accordingly, another intent may correspond to a persuasion input to persuade the buyer(s) to increase the offered monetary amount. Conversely, if the buyers expectations have not been met, an intent may be to persuade the seller to decrease the asking price for the object. In the case that negotiations have stalled, meaning the conversational agents themselves cannot work out a solution that meets both the buyers and sellers objectives, the arbitration intents may be used to request additional input from the user corresponding to one of the conversational agents. As an example, the user corresponding to the seller conversational agent may be asked by the system to decrease the asking price.

The system may also have a dialog tree that includes different conversational nodes that can be accessed by the conversational agent(s) within the arbitration instance. These nodes are generated based upon the arbitration specification and conversational agent roles and constraints. Thus, during the negotiation the conversational agent(s) and/or system can access a node within the dialog tree in order to perform the negotiation. Other than being specifically programmed for an arbitration instance and/or particular conversational agent, the dialog tree is similar to dialog trees or dialog flows for conventional conversational agents.

At 103, the system determines whether there is a conversational agent within the conversational agent creation framework having the opposing role with respect to the object. As with all the conversational agents, the conversational agent having an opposing role will also be programmed with negotiation constraints, referred to as opposing role negotiation constraints simply for ease of readability. The purpose of these constraints is the same as the constraints of all the conversational agents, and, like the other conversational agents, are unique to the user who created the conversational agent. Using the working example, if the conversational agent role that was selected at 101 and created at 102 was the seller role for the painting, the system, at 103, determines whether there is a conversational agent having a buyer role for the painting within the framework. To make this determination the system may compare entities across arbitration instances to determine if there are matching object entities that correspond to conversational agents having opposing roles. The determination may also be made in view of other parameters or constraints, for example, location constraints identifying a geographical location of the object desired by the user, time constraints identifying a timeframe for performing a negotiation, and the like. If a match is not found, the system continues to monitor the framework for conversational agents with the opposing role at 105.

If, however, a match is found, the system conducts a conversational session between the conversational agent and the opposing role conversational agent at 104. In the case that there is more than one conversational agent having an opposing role, the conversational session may include all or more than one of the opposing role conversational agents.

For example, if there is more than one buyer interested in the object the seller is trying to sell, the conversational session may occur between the seller conversational agent and each of the conversational agents of multiple buyers. The conversational session is the negotiation between the conversational agents to resolve the arbitration. Using the working example, the negotiation is between the conversational agent of the seller trying to sell the painting and the conversational agent(s) of the buyer(s) trying purchase the agent. The conversational session is performed in view of each of the constraints of the conversational agents. Additionally, the conversational agents attempt to maximize the objective of the corresponding user. The constraints are kept secret and are not globally known to each of the other conversational agents within the framework. Thus, the negotiation can occur much like a negotiation would occur between human users.

In conducting the conversational session, the conversational agents may traverse the nodes included within the dialog tree to communicate between the conversational agents. During the conversational session, the system may determine that one or more objectives of one or more of the conversational agents have not been met. For example, if the initial offering price from the buyer(s) is lower than the minimum price that the seller is willing to take, the seller conversational agent objective has not been met. In this case, the system may provide a persuasion input. The persuasion input may be utilized in order to get an opposing conversational agent to change an offer, for example, a conversational agent of the buyer to increase the offer price. The persuasion inputs may be included in the dialog tree and may be based upon the arbitration specification.

During the conversational session, the system may determine that the negotiations have stalled, for example, the objectives of the seller and buyer do not allow for a successful outcome. As an example, if the seller's minimum price is greater than the buyer's maximum price, the system will be unable to resolve the negotiation. In this case, the system may request input from one or more of the users corresponding to the conversational agent(s). For example, if the conversational agent(s) corresponding to the buyer(s) will not increase the offer price to match the minimum price identified by the seller, the system may request input from the seller. The requested input may include informing the user of the status of the negotiations and requesting the user to identify if the current terms are acceptable to the user. Once a negotiation is successful, the system may change or mark the state of the arbitration instance to resolved, complete, or the like.

Figure 2:
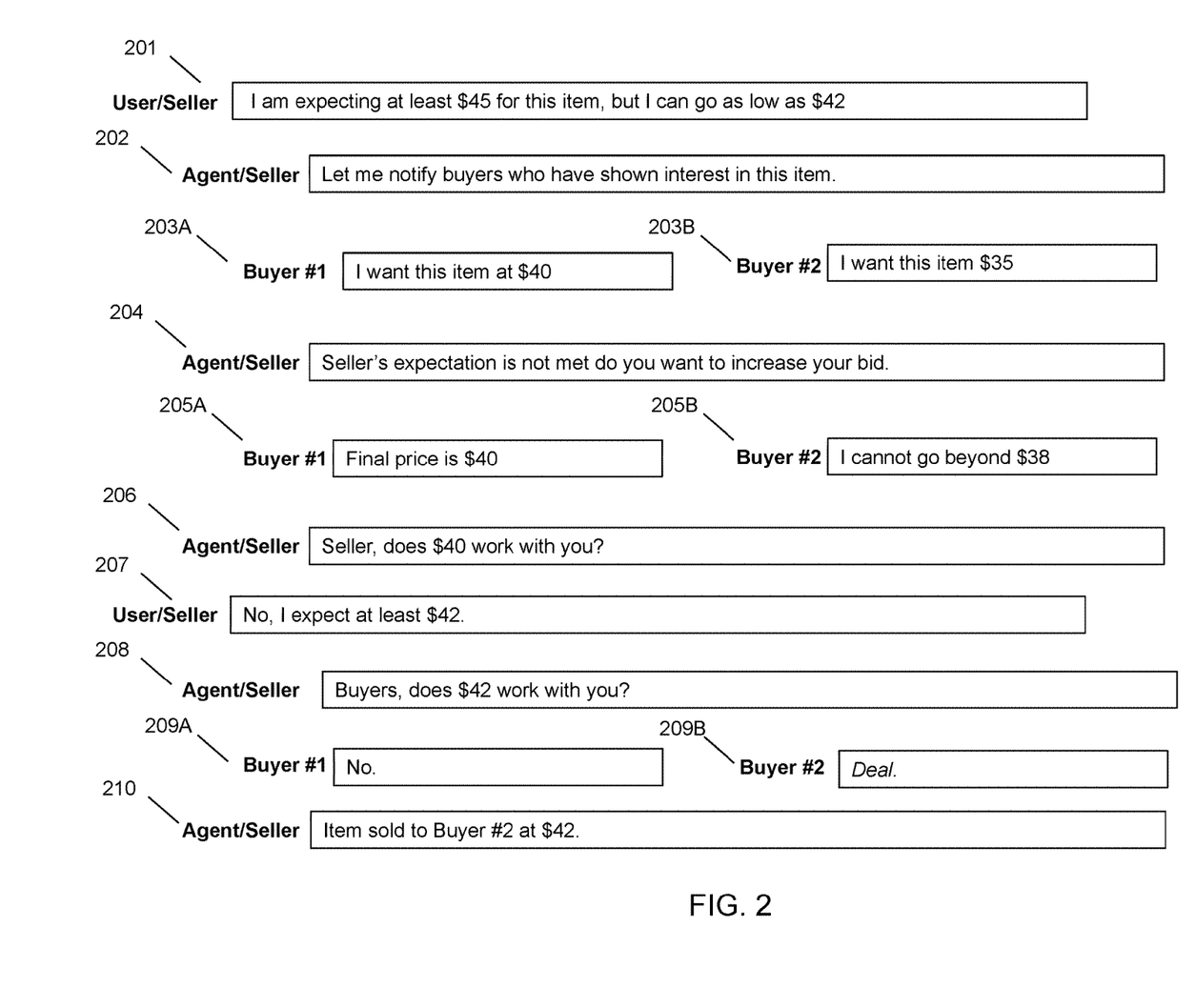
FIG. 2 illustrates an example conversational session utilizing conversational agents for each role within the conversation.

FIG. 2 illustrates an example conversational session between a conversational agent corresponding to a seller and two conversational agents corresponding to buyers. At 201 the seller provides expectations for an object, which include a desired price of $45 and a minimum price of $42. The conversational agent corresponding to the seller then notifies buyers that have shown an interest in this item at 202. Finding buyers that have shown an interest may include searching the framework to find the conversational agent having the opposing role, a buyer in this example. The conversational agents for the buyers then provide starting bid prices of $40 at 203A and $35 at 203B. Since the seller's expectations have not been met, the seller conversational agent 204 provides a persuasion input at 204 asking the buyer's to increase the bids. The conversational agents for the buyers identify that the $40 bid of buyer #1 is firm at 205A and the bid of buyer #2 is increased to $38 at 205B. Since the seller's expectations are still not met, the seller's conversational agent requests input from the seller at 206 asking if $40 is acceptable. The seller provides input indicating that the minimum price is still $42 at 207.

The seller conversational agent provides another persuasion input at 208 indicating the minimum acceptable price of the seller. The conversational agent of buyer #1 indicates no deal at 209A. The conversational agent of buyer #2 indicates that this price is acceptable at 209B. The seller conversational agent then identifies the sale of the price at $42 to buyer #2 at 210. Within the framework, the system would then mark this transaction, arbitration, or negotiation as complete. Upon completion the system may also provide additional information to the user(s) in order to complete the transaction, for example, payment details, shipping details, pick-up details, and the like. Thus, the conversational agents were able to perform the negotiation with very little interaction from any of the human users. Additionally, negotiations may frequently be performed without any interaction from the human users.

Figure 3:
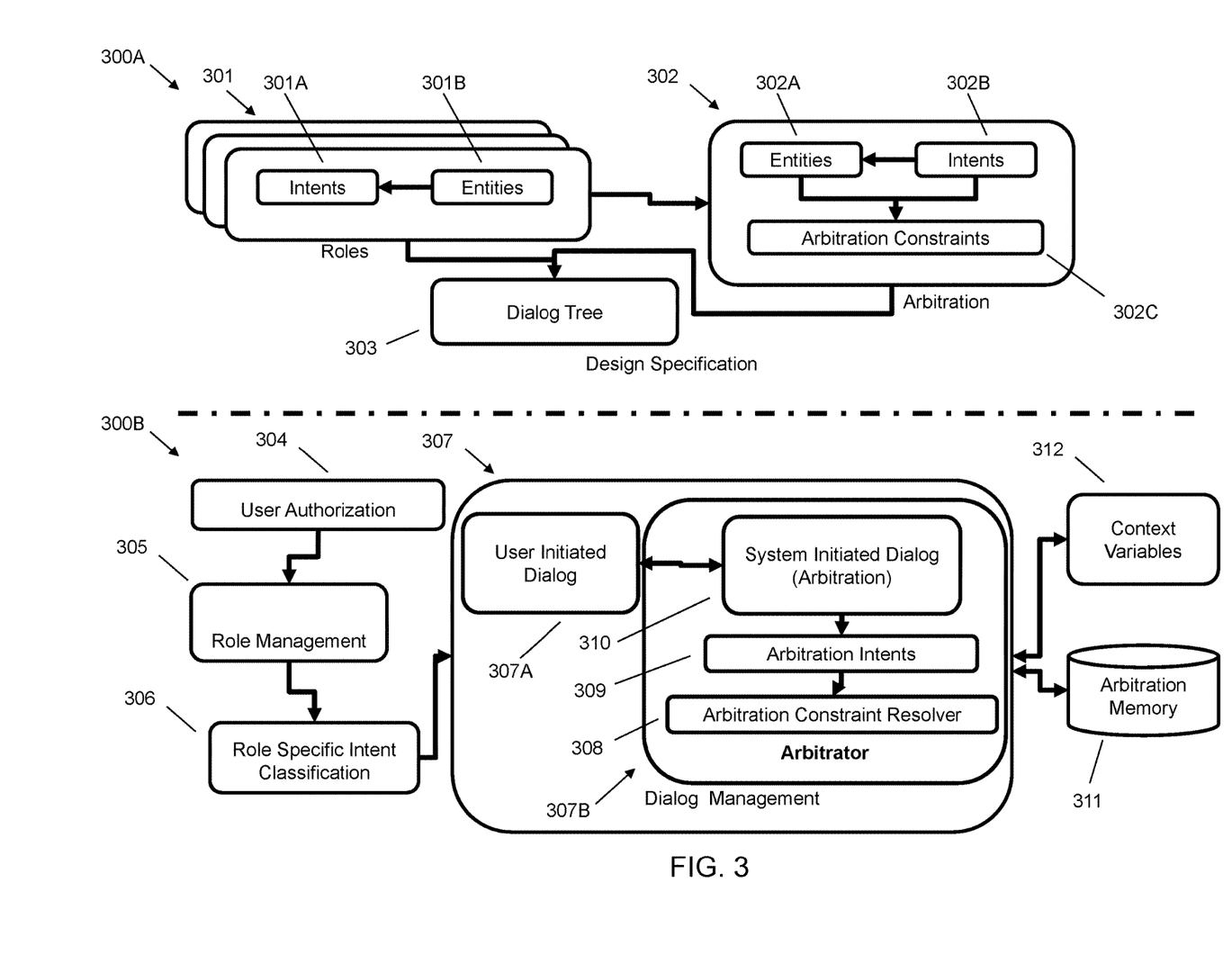
FIG. 3 illustrates an example system architecture for providing a conversational agent creation framework for multi-agent conversational sessions.

FIG. 3 illustrates an example system diagram of the system framework. The framework includes a design specification 300A. The design specification 300A includes conversational agent roles 301 that are programmed with intents 301A and entities 301B. The design specification 300A also includes the arbitration instance 302 that is programmed with entities 302A, intents 302B, and arbitration constraints 302C. The design specification 300A also includes the dialog tree 303. Information from each of these components are utilized by other components to make up the design specification for each arbitration within the framework. The design specification 300A is utilized for creating and programming the arbitration.

The framework also includes an arbitration runtime 300B, which provides the programming necessary for performing the arbitration. The arbitration runtime 300B utilizes the design specification 300A to perform the arbitration. The runtime 300B receives user authorization 304 to perform the arbitration. The user creates the conversational agent by selecting the desired role 305. The conversational agent is then programmed with role specific intents 306 based upon the role classification. Once conversational agents for the negotiation or arbitration are identified, a conversational session is performed utilizing dialog management 307. The dialog management 307 can include both user initiated dialog 307A and agent or arbitrator dialog 307B. The arbitrator has system initiated dialog 310 that is based upon and performed in view of the arbitration intents 309 and arbitration constraints 308. The dialog management 307 is also able to pull information from the context variable 312 and the arbitration memory 311 which are generated from the design specification 300A.

Thus, the described systems and methods represent a technical improvement over current conversational agent systems. Rather than having a conversational agent system where at least one of the parties within a conversational session is a human user, the described system allows for execution of a conversational agent without requiring user input during performance of the conversational session. In other words, the conversational agents can execute a conversational session automatically while maintaining the objectives of the human user corresponding to the conversational agent. Instead of current systems that do not allow for the specification of multiple conversational agents having different, and often opposing roles, the described system allows for these multiple role agents. Thus, the described system and method requires less user input and, thus, less time commitments by a human user. Additionally, since the conversational agents can perform autonomously, the human user can have multiple agents that are working on separate negotiations or arbitrations at the same time, which is very difficult, if not impossible using conventional negotiation systems.

Figure 4:
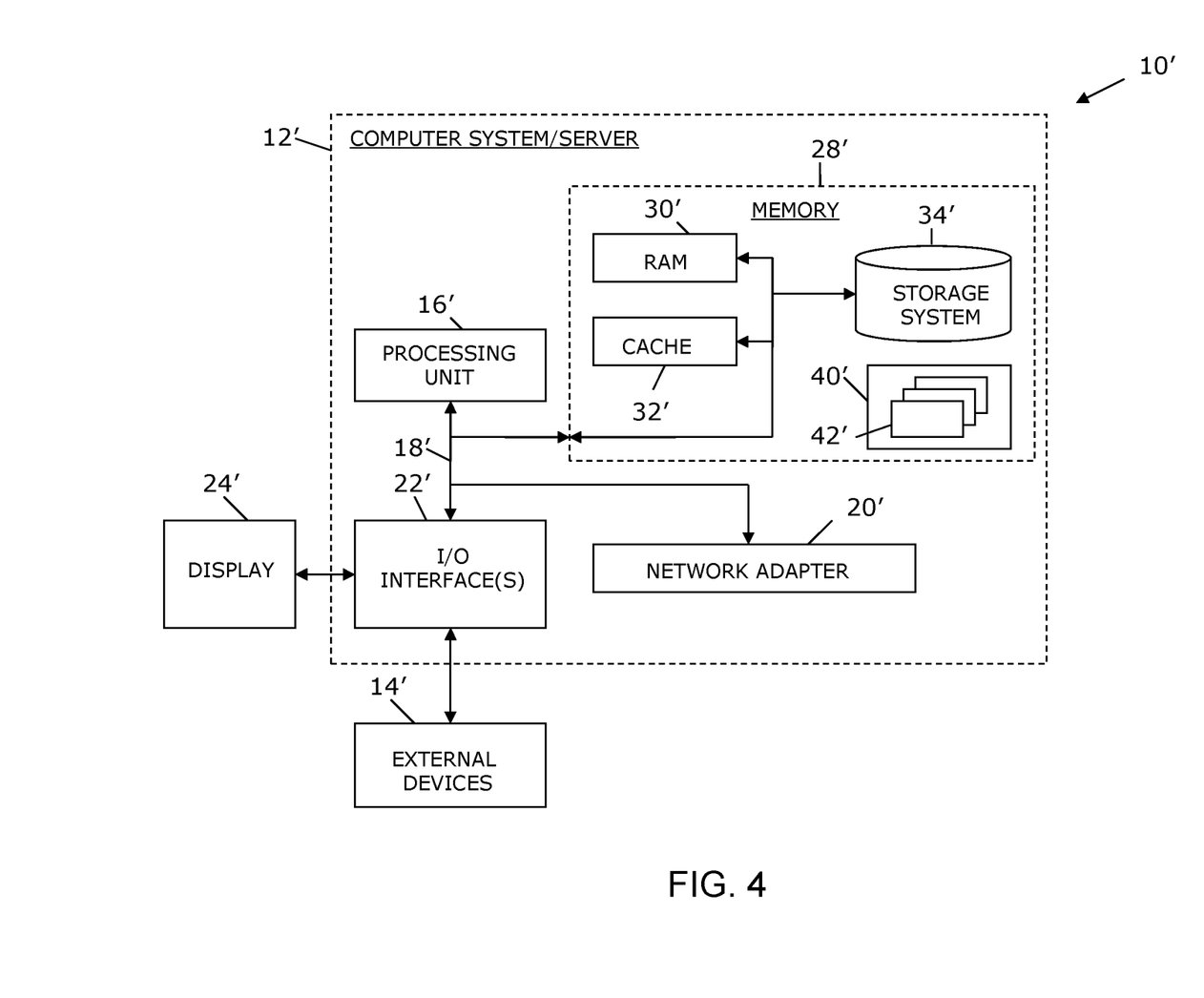
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
    providing a conversational agent creation framework that creates conversational agents based upon input from a plurality of users, wherein within the conversational agent creation framework the conversational agents interact and perform negotiations on behalf of users for objects without requiring input from the plurality of users;
    receiving, within the conversational agent creation framework and from one of the plurality of users, input to generate an instance of a conversational agent to perform a negotiation on behalf of the at least one of the plurality of users, wherein the input comprises (i) a selection of one of a plurality of conversational agent roles, each of the plurality of conversational agent roles corresponding to a role within a negotiation, (ii) negotiation constraints for the selected role, and (iii) an object for the negotiation, wherein the conversational agent creation framework comprises a plurality of created instances of a conversational agent having a particular role, wherein the instance is unique to the one of the plurality of users the object identified by the user, wherein the conversational agent creation framework comprises a plurality of created instances of a conversational agent having a particular role; creating, within the conversational agent creation framework, the instance of the conversational agent, wherein the instance (i) has the selected role, (ii) is programmed with the negotiation constraints, and (iii) is unique to the object for the negotiation and the one of the plurality of users;
    identifying, within the conversational agent creation framework, at least one other instance of a conversational agent, wherein the at least one other instance (i) has an opposing role with respect to the object and (ii) is programmed with opposing role negotiation constraints;
    conducting, within a negotiation instance created within the conversational agent creation framework, the negotiation instance being unique to the instance of the conversational agent, the at least one other instance of a conversational agent, and the object, in response to identifying the at least one other instance of a conversational agent, a conversational session between a conversational agent corresponding to the instance of a conversational agent and at least one other conversational agent corresponding to the at least one other instance of a conversational agent, wherein the conducting comprises each of the conversational agent and the at least one other conversational agent traversing nodes included within a dialog tree generated based upon a negotiation specification comprising data corresponding to the negotiation instance, the roles of the conversational agent and the at least one other conversational agent, and the negotiation constraints;

the conversational session comprising the negotiation between the conversational agent and the at least one other conversational agent for the object and wherein, within the conversational session, the conversational agent and the at least one other conversational agent perform, without requiring input from the one of the plurality of users and users who created the at least one other instance of a conversational agent, the negotiation in view of the negotiation constraints and the opposing role negotiation constraints, wherein the negotiation instance comprises a structure for populating parameters, entities, and objects within the negotiation instance and is populated with at least negotiation entities corresponding to the object, the instance of the conversational agent, and the at least one other instance of a conversational agent, wherein each of the negotiation entities comprise object identifiers for the object of a corresponding negotiation entity; and providing, from the conversational agent creation framework and responsive to completing a negotiation, information to the one of the plurality of users regarding the completed negotiation.

2. The method of claim 1, wherein the conducting a conversational session comprises requesting user input responsive to determining at least one of: (i) the negotiation constraints and (ii) the opposing role negotiation constraints cannot be met.

3. The method of claim 1, wherein the role of the at least one other conversational agent comprises a buyer role; and
wherein the opposing role negotiation constraints comprise a maximum monetary amount that a user corresponding to the at least one other conversational agent is willing to pay for the object.

4. The method of claim 1, wherein the role of the conversational agent comprises a seller role; and
wherein the negotiation constraints comprise (i) a desired monetary amount and (ii) an acceptable monetary amount.

5. The method of claim 1, wherein the conducting a conversational session comprises providing, by at least one of the conversational agent and the at least one other conversational agent, a persuasion input, responsive to determining at least one of: (i) the negotiation constraints and (ii) the opposing role negotiation constraints cannot be met.

6. The method of claim 1, wherein the identifying a least one other conversational agent comprises identifying a match between the object corresponding to the conversational agent and an object corresponding to the at least one other conversational agent.

7. The method of claim 1, wherein the identifying at least one other conversational agent is based upon location constraints provided by a user, the location constraints identifying a geographical location for the object.

8. The method of claim 1, comprising marking an object as completed upon a successful negotiation for the object.

9. An apparatus, comprising:
at least one processor; and
a computer readable storage medium having computer readable program code embodied therewith and executable by the at least one processor, the computer readable program code comprising:

computer readable program code configured to provide a conversational agent creation framework that creates conversational agents based upon input from a plurality of users, wherein within the conversational agent creation framework the conversational agents interact and perform negotiations on behalf of users for objects without requiring input from the plurality of users;

computer readable program code configured to receive, within the conversational agent creation framework and from one of the plurality of users, input to generate an instance of a conversational agent to perform a negotiation on behalf of the at least one of the plurality of users, wherein the input comprises (i) a selection of one of a plurality of conversational agent roles, each of the plurality of conversational agent roles corresponding to a role within a negotiation, (ii) negotiation constraints for the selected role, and (iii) an object for the negotiation, wherein the conversational agent creation framework comprises a plurality of created instances of a conversational agent having a particular role, wherein the instance is unique to the one of the plurality of users the object identified by the user, wherein the conversational agent creation framework comprises a plurality of created instances of a conversational agent having a particular role;

computer readable program code configured to create, within the conversational agent creation framework, the instance of the conversational agent, wherein the instance (i) has the selected role, (ii) is programmed with the negotiation constraints, and (iii) is unique to the object for the negotiation and the one of the plurality of users;

computer readable program code configured to identify, within the conversational agent creation framework, at least one other instance of a conversational agent, wherein the at least one other instance (i) has an opposing role with respect to the object and (ii) is programmed with opposing role negotiation constraints;

computer readable program code configured to conduct, within a negotiation instance created within the conversational agent creation framework, the negotiation instance being unique to the instance of the conversational agent, the at least one other instance of a conversational agent, and the object, in response to identifying the at least one other instance of a conversational agent, a conversational session between a conversational agent corresponding to the instance of a conversational agent and at least one other conversational agent corresponding to the at least one other instance of a conversational agent, wherein the conducting comprises each of the conversational agent and the at least one other conversational agent traversing nodes included within a dialog tree generated based upon a negotiation specification comprising data corresponding to the negotiation instance, the roles of the conversational agent and the at least one other conversational agent, and the negotiation constraints;

the conversational session comprising the negotiation between the conversational agent and the at least one other conversational agent for the object and wherein, within the conversational session, the conversational agent and the at least one other conversational agent perform, without requiring input from the one of the plurality of users and users who created the at least one other instance of a conversational agent, the negotiation in view of the negotiation constraints and the opposing role negotiation constraints, wherein the negotiation instance comprises a structure for populating parameters, entities, and objects within the negotiation instance and is populated with at least negotiation entities corresponding to the object, the instance of the conversational agent, and the at least one other instance of a conversational agent, wherein each of the negotiation entities comprise object identifiers for the object of a corresponding negotiation entity; and computer readable program code configured to provide, from the conversational agent creation framework and responsive to completing a negotiation, information to the one of the plurality of users regarding the completed negotiation.

10. A computer program product, comprising:

a computer readable storage medium having computer readable program code embodied therewith, the computer readable program code executable by a processor and comprising: computer readable program code configured to provide a conversational agent creation framework that creates conversational agents based upon input from a plurality of users, wherein within the conversational agent creation framework the conversational agents interact and perform negotiations on behalf of users for objects without requiring input from the plurality of users;

computer readable program code configured to receive, within the conversational agent creation framework and from one of the plurality of users, input to generate an instance of a conversational agent to perform a negotiation on behalf of the at least one of the plurality of users, wherein the input comprises (i) a selection of one of a plurality of conversational agent roles, each of the plurality of conversational agent roles corresponding to a role within a negotiation, (ii) negotiation constraints for the selected role, and (iii) an object for the negotiation, wherein the conversational agent creation framework comprises a plurality of created instances of a conversational agent having a particular role, wherein the instance is unique to the one of the plurality of users the object identified by the user, wherein the conversational agent creation framework comprises a plurality of created instances of a conversational agent having a particular role;

computer readable program code configured to create, within the conversational agent creation framework, the instance of the conversational agent, wherein the instance (i) has the selected role, (ii) is programmed with the negotiation constraints, and (iii) is unique to the object for the negotiation and the one of the plurality of users;

computer readable program code configured to identify, within the conversational agent creation framework, at least one other instance of a conversational agent, wherein the at least one other instance (i) has an opposing role with respect to the object and (ii) is programmed with opposing role negotiation constraints;

computer readable program code configured to conduct, within a negotiation instance created within the conversational agent creation framework, the negotiation instance being unique to the instance of the conversational agent, the at least one other instance of a conversational agent, and the object, in response to identifying the at least one other instance of a conversational agent, a conversational session between a conversational agent corresponding to the instance of a conversational agent and at least one other conversational agent corresponding to the at least one other instance of a conversational agent, wherein the conducting comprises each of the conversational agent and the at least one other conversational agent traversing nodes included within a dialog tree generated based upon a negotiation specification comprising data corresponding to the negotiation instance, the roles of the conversational agent and the at least one other conversational agent, and the negotiation constraints;

the conversational session comprising the negotiation between the conversational agent and the at least one other conversational agent for the object and wherein, within the conversational session, the conversational agent and the at least one other conversational agent perform, without requiring input from the one of the plurality of users and users who created the at least one other instance of a conversational agent, the negotiation in view of the negotiation constraints and the opposing role negotiation constraints, wherein the negotiation instance comprises a structure for populating parameters, entities, and objects within the negotiation instance and is populated with at least negotiation entities corresponding to the object, the instance of the conversational agent, and the at least one other instance of a conversational agent, wherein each of the negotiation entities comprise object identifiers for the object of a corresponding negotiation entity; and computer readable program code configured to provide, from the conversational agent creation framework and responsive to completing a negotiation, information to the one of the plurality of users regarding the completed negotiation.

11. The computer program product of claim 10, wherein the conducting a conversational session comprises requesting user input responsive to determining at least one of: (i) the negotiation constraints and (ii) the opposing role negotiation constraints cannot be met.

12. The computer program product of claim 10, wherein the role of the at least one other conversational agent comprises a buyer role; and wherein the opposing role negotiation constraints comprise a maximum monetary amount that a user corresponding to the at least one other conversational agent is willing to pay for the object.

13. The computer program product of claim 10, wherein the role of the conversational agent comprises a seller role; and wherein the negotiation constraints comprise (i) a desired monetary amount and (ii) an acceptable monetary amount.

14. The computer program product of claim 10, wherein the conducting a conversational session comprises providing, by at least one of the conversational agent and the at least one other conversational agent, a persuasion input, responsive to determining at least one of: (i) the negotiation constraints and (ii) the opposing role negotiation constraints cannot be met.

15. The computer program product of claim 10, wherein the identifying a least one other conversational agent comprises identifying a match between the object corresponding to the conversational agent and an object corresponding to the at least one other conversational agent.

16. The computer program product of claim 10, wherein the identifying at least one other conversational agent is based upon location constraints provided by a user, the location constraints identifying a geographical location for the object.

* * * * *